UNITED STATES PATENT OFFICE.

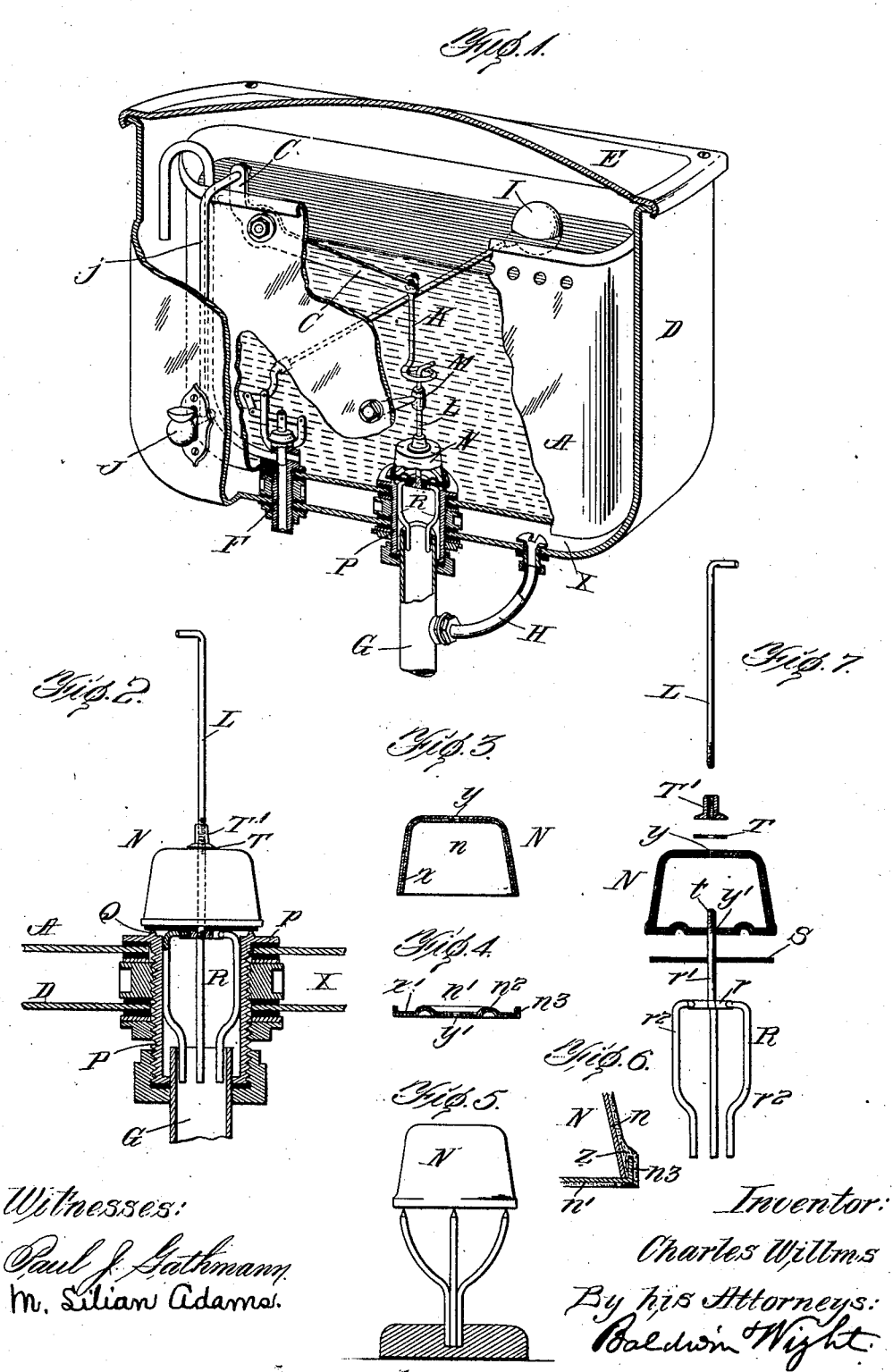

CHARLES WILLMS, OF BALTIMORE, MARYLAND.

FLUSHING-TANK.

No. 849,708. Specification of Letters Patent. Patented April 9, 1907.

Application filed October 26, 1906. Serial No. 340,677.

*To all whom it may concern:*

Be it known that I, CHARLES WILLMS, a citizen of the United States, residing in Baltimore city, State of Maryland, have invented certain new and useful Improvements in Flushing-Tanks, of which the following is a specification.

My invention relates to flushing-tanks of the kind in which the flush-water is delivered through an opening in the bottom of the tank, which is normally closed by a valve that is opened by hand and which automatically closes when the tank is emptied or nearly emptied. Such valves are commonly made in such manner as to be more or less buoyant, so as to stand open or away from the valve-seat until the flushing operation is completed. Valves of this kind are often made of metal, such as copper, having faces next the valve-seat made of rubber, vulcanized fiber, or similar soft material. These valves are also sometimes made of rubber or of glass. When made of metal, such as copper, the chemical action of the water will often cause the metal to corrode and render the valve inoperative. When made of glass, there is always liability of breakage. When such valves are made of rubber, it is necessary to embed a socket-piece in the valve to receive the valve-spindle, and such socket-piece often separates from the valve, and thus renders the valve inoperative. Furthermore, valves made of rubber will in time harden and crack and become leaky and are thus made useless.

According to my invention I form valves of this kind of metal and cover them with vitreous enamel in such manner as to protect them from corrosive action and render them practically indestructible. The bottom of the valve I face with rubber or other suitable material, and the valve-seat, which is of improved construction, is formed with an annular rib lying close to the bottom of the tank and which receives the soft facing on the bottom of the valve.

In the accompanying drawings I have shown my improvements applied to a tank of the kind shown in my prior applications, filed March 13, 1906, and September 5, 1906, in which applications the tank is shown and described as being formed of thin sheet metal and enameled and associated with a condensation-collector also formed of sheet metal and enameled and which receives water of condensation dripping from the water-containing tank. My present improvements, however, relate solely to the valve controlling the flush-opening and the valve-seat associated therewith.

Figure 1 is a perspective view of a flushing-tank embodying my improvements, some of the parts being shown in section and some parts being broken away to better illustrate other parts. Fig. 2 is a view, partly in elevation, partly in section, and on an enlarged scale, of my improved valve and its seat. Fig. 3 is a detail view in section of the main body portion of the valve coated on the inside with an enameling composition. Fig. 4 is a detail view, in transverse section, of the body portion of the valve coated on its upper side with an enameling composition. Fig. 5 shows the valve covered on the outside with enameling composition and ready to be fired. Fig. 6 is a detail view showing how the enameling composition is applied around the joint of the body portion of the valve with the bottom thereof. Fig. 7 shows how the valve, its stem, guide, and rubber facing are assembled.

The general organization of the tank and its accessories is similar to that shown in my applications for patent above mentioned.

The water-containing tank A is surrounded by a jacket or condensation-collector D, which is provided with a removable cover E. There is an air-space X surrounding the water-containing tank between it and the condensation-collector. The inlet-valve and its attaching devices F are of the kind shown in my prior applications and need not be here described.

The flush-pipe G is connected, by the means of a branch pipe H, with the space X, surrounding the water-tank, and the water of condensation and also overflow water pass through this branch pipe to the discharge-pipe G.

The float I operates in the usual way, and the handle J is connected by a rod j to the lever C, which carries a rod K, connecting loosely with the valve-stem L, guided by a bracket M and connected in the manner hereinafter described to the valve N, which controls the flow of flush-water to the discharge-pipe G. The valve-seat P is connected with the flush-pipe G, the tank A, and the condensation-collector D in the same way as that described in my application for patent filed September 5, 1906; but the details of construction of the valve-seat are somewhat different. In my prior application just referred to the valve is in the form of a ball made of rubber and the valve-seat is below the level of the bottom of the water-containing tank. According to my present invention the bottom of the valve is flat and the flange p of the valve-seat is made to lie close to the bottom of the tank and is provided with an annular rib Q to receive the valve. This valve-seat, the construction of which is clearly shown in Fig. 2, is made by drawing a tube into shape in a similar manner to that described in my application of September 5, 1906. By thus forming the seat by a drawing process instead of by a casting process I am enabled to produce a valve-seat free from blow-holes or irregularities commonly found in castings, which often render the valve-seat leaky and otherwise objectionable.

The valve proper, N, is formed in two parts, the body portion n and the bottom part n'. The part n is preferably made of a single piece of sheet steel or iron drawn into the shape indicated in Fig. 2. The part n' is also preferably made of a single piece of metal, having a strengthening annular rib $n^2$ and a flange $n^3$, adapted to receive the bottom edge of the part n, as clearly shown in Figs. 6 and 7.

In order to render the valve proof against any liability of corrosion, I coat it with a vitrified enamel. Preferably I coat it on both the inside and the outside, although it is not positively necessary to coat it on the inside; but as a matter of precaution to avoid possible corrosion, owing to any slight leak, an inner coating is preferably provided. When this is the case, the upper section n of the valve is coated on the inside with an enameling composition, as indicated at x in Fig. 3, and the bottom section of the valve is coated on the upper or inner side in the manner indicated at x' in Fig. 4.

It will be noted that there is an opening in the section n at y and in the section n' at y'. These are for the purpose of receiving a rod which is connected with the valve-guide and with the valve-stem; but they also serve the purpose of permitting the escape of heated air during firing process. I would remark, however, that only one opening is needed for this purpose.

When the two sections of the valve are coated in the manner above specified, the parts are assembled and then coated completely on the outside with the enameling composition, as indicated in Figs. 5, 6, and 7. When thus coated, the valve may be supported in the manner indicated in Fig. 5 and fired until the vitrified enamel is produced. The valve is then ready to be connected with its stem and guide.

It will be observed by reference to Fig. 6 that the flange $n^3$ does not lie close to the inclined walls of the section n of the valve, whereby a trough or gutter z is produced, which receives a more liberal supply of enamel than would otherwise be the case, and the upper edge of the flange also holds an increased quantity of enamel. In this way not only are the two sections of the valve firmly united with each other, but the joint is completely sealed. The valve N thus completed is shown in section in Fig. 7.

I provide the valve with a guide R, which is shown as consisting of a circular plate r, carrying an upwardly-projecting centrally-arranged spindle r' and downwardly-projecting rods $r^2$, which act as guides in the manner indicated in Fig. 2. Before connecting the guide with the valve I place on the spindle r' a washer S, of rubber or similar soft material. Then the spindle is passed through the openings y' and y and a soft washer T is placed on the spindle, and then the nut T' is applied to the upper screw-threaded end t of the spindle r'. In this way the guide is securely connected to the valve and the washer S is held firmly in place. The valve-spindle L is then connected with the nut T' in the manner clearly indicated in the drawings. The valve is now complete and ready to be placed on its seat.

The valve operates in precisely the same manner as other valves of its class, but is indestructible, being neither liable to break in handling or to corrode by the chemical action of the flush-water. It is also cleaner than most valves, not being so liable to collect sediment, and can be easily cleaned if necessary.

If desired, in order to insure perfect enameling I may apply a second coat of enamel to the outside of the valve. When this is done, an enameling composition should be used for the outer coating which melts or fluxes at a lower temperature than that of the first coating.

It will be observed that the bracket M is attached to the front wall of the water-containing tank and that these attaching devices do not extend through the space between the tank and the collector and that they are not exposed at the outside. The bracket M operates both as a guide and a stop to limit the upward movement of the valve N, the arrangement being such that the valve cannot move to such a degree upward as to withdraw the guide-rods $r^2$ from the valve-seat P. In this way the valve is prevented from being moved so far out of the way as to be unable to find its seat when it closes.

I claim as my invention—

1. A hermetically-sealed hollow buoyant valve made in assembled sections covered with vitrified enamel and provided with holes in the upper and lower sections in line with each other, a rod extending through said holes, a nut above the upper section to which said rod is connected, a valve-stem connected with said nut and guide-rods attached to said first-mentioned rod and extending downwardly from the valve.

2. The combination of a water-containing tank, a condensation-collector associated therewith and having an air-space between its bottom and the bottom of the tank, a valve-seat extending through said air-space, a flush-pipe connected with the valve-seat, means for draining water from the condensation-collector into the flush-pipe, a flush-valve, downwardly-projecting guide-rods fitting the valve-seat, a valve-stem and a guide for the valve-stem secured to the water-containing tank and which acts as a stop to limit the upward movement of the valve.

3. The combination of a water-containing tank, a condensation-collector surrounding it and having an air-space between its bottom and the bottom of the tank, a valve-seat extending through said air-space, a flush-pipe connected therewith and receiving flush-water from the valve-seat, means for draining water from the condensation-collector, a valve, the guide-rods extending downwardly therefrom and guided by the vertical walls of the valve-seat, and a stop attached to the front wall of the water-containing tank for so limiting the upward movement of the valve that the guide-rods are prevented from rising out of the valve-seat.

In testimony whereof I have hereunto subscribed my name.

CHARLES WILLMS.

Witnesses:
  WM. B. RAYNER,
  JOHN J. CULLEN.